US012330430B2

(12) United States Patent
Muraki et al.

(10) Patent No.: US 12,330,430 B2
(45) Date of Patent: Jun. 17, 2025

(54) THERMAL PRINT HEAD, THERMAL PRINTER, AND METHOD OF MANUFACTURING HEAT SINK

(71) Applicant: ROHM CO., LTD., Kyoto (JP)

(72) Inventors: Kaoru Muraki, Kyoto (JP); Kuniaki Nakamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 187 days.

(21) Appl. No.: 18/165,691

(22) Filed: Feb. 7, 2023

(65) Prior Publication Data

US 2023/0182483 A1 Jun. 15, 2023

Related U.S. Application Data

(63) Continuation of application No. PCT/JP2021/026870, filed on Jul. 16, 2021.

(30) Foreign Application Priority Data

Aug. 25, 2020 (JP) ................................ 2020-141644

(51) Int. Cl.
*B41J 2/375* (2006.01)
*B41J 2/335* (2006.01)

(52) U.S. Cl.
CPC ............ *B41J 2/375* (2013.01); *B41J 2/3358* (2013.01)

(58) Field of Classification Search
CPC ... B41J 2/375; B41J 2/3358; B41J 2/32; B41J 2/335
See application file for complete search history.

(56) References Cited

U.S. PATENT DOCUMENTS

2019/0193417 A1* 6/2019 Yamauchi .............. B41J 2/3357

FOREIGN PATENT DOCUMENTS

| | | |
|---|---|---|
| JP | S60-174661 | 9/1985 |
| JP | H07-101124 | 4/1995 |
| JP | H09-290546 A | 11/1997 |
| JP | 2020-075460 A | 5/2020 |

OTHER PUBLICATIONS

Office Action issued for German Patent Application No. 112021003884.2, Apr. 11, 2023, 14 pages including English translation.
International Search Report of PCT/JP2021/026870, Oct. 5, 2021, 3 pages.
Chinese Office Action issued in CN 202180055856.7, mailed Nov. 5, 2024, 15 pages, English machine translation.
Japanese Office Action issued in JP Patent Application No. 2022-545535, dated Apr. 22, 2025, 6 pages, English machine translation provided.

* cited by examiner

*Primary Examiner* — Thinh H Nguyen
(74) *Attorney, Agent, or Firm* — HSML P.C.

(57) ABSTRACT

A thermal print head includes: a head substrate on which a plurality of heating resistance units are formed; a heat sink thermally connected to the head substrate, a recess being formed in a back surface of the heat sink which faces a surface to which the head substrate is connected; a metal member arranged in the recess; and an adhesive arranged between a bottom surface of the recess and the metal member. The recess viewed from a direction perpendicular to the back surface includes: an area where the metal member is arranged, and a groove area where the metal member is not arranged. A portion of the adhesive is arranged in the groove area.

15 Claims, 7 Drawing Sheets

THERMAL PRINT HEAD, THERMAL PRINTER, AND METHOD OF MANUFACTURING HEAT SINK

CROSS REFERENCE TO RELATED APPLICATIONS AND INCORPORATION BY REFERENCE

This is a continuation application (CA) of PCT Application No. PCT/JP2021/026870, filed on Jul. 16, 2021, which claims priority to Japan Patent Application No. P2020-141644 filed on Aug. 25, 2020 and is based upon and claims the benefit of priority from prior Japanese Patent Application No. P2020-141644 filed on Aug. 25, 2020 and PCT Application No. PCT/JP2021/026870, filed on Jul. 16, 2021; the entire contents of each of which are incorporated herein by reference.

FIELD

The present embodiment relates to a thermal print head, a thermal printer, and a method of manufacturing a heat sink.

BACKGROUND

A thermal print head is a device which implements recording by reacting thermally reactive materials such as thermal paper or thermal transfer ribbons using Joule heat generated by energizing resistors on a substrate. A thermal printer includes the thermal print head described above.

A thermal print head includes a heat sink that dissipates heat from the substrate. The heat sink is also used as a base when the thermal print head is attached to a printer body. Conventionally, the heat sink was screwed to the printer body.

SUMMARY

When a thermal print head is to be fixed to a printer body by the magnetic force of a magnet instead of screwing, a recess is formed in the surface (back surface) of a heat sink in contact with the printer body, and a metal plate is attached in the recess. The metal plate exhibits magnetism by bringing the heat sink close to a magnet provided in the printer body, and thus the thermal print head is fixed to the printer body.

The bottom surface of the recess of the heat sink and the metal plate are bonded by an adhesive. When the amount of adhesive is large, excess adhesive leaks onto the back surface of the heat sink, requiring effort to wipe off. Meanwhile, when the amount of adhesive is small, sufficient adhesive strength is not acquired and thus the metal plate falls off the heat sink.

The present disclosure has been made in view of the above problems, and an object of the present disclosure is to provide a thermal print head and a thermal printer which suppress the leakage of adhesive onto the back surface of a heat sink and restrict a metal member from falling off. In addition, an object of the present disclosure is to provide a method of manufacturing a heat sink which is capable of simplifying the manufacturing process.

In order to solve the above problems, a thermal print head according to the present disclosure includes: a head substrate on which a plurality of heating resistance units are formed; a heat sink thermally connected to the head substrate, a recess being formed in a back surface of the heat sink which faces a surface to which the head substrate is connected; a metal member arranged in the recess; and an adhesive arranged between a bottom surface of the recess and the metal member. The recess viewed from a direction perpendicular to the back surface includes: an area where the metal member is arranged, and a groove area where the metal member is not arranged. A portion of the adhesive is arranged in the groove area.

The present disclosure makes it possible to provide a thermal print head and a thermal printer which suppress the leakage of adhesive onto the back surface of a heat sink and restrict a metal member from falling off. In addition, the present disclosure makes it possible to provide a method of manufacturing a heat sink which is capable of simplifying the manufacturing process.

DESCRIPTION OF EMBODIMENTS

Figure 1A:
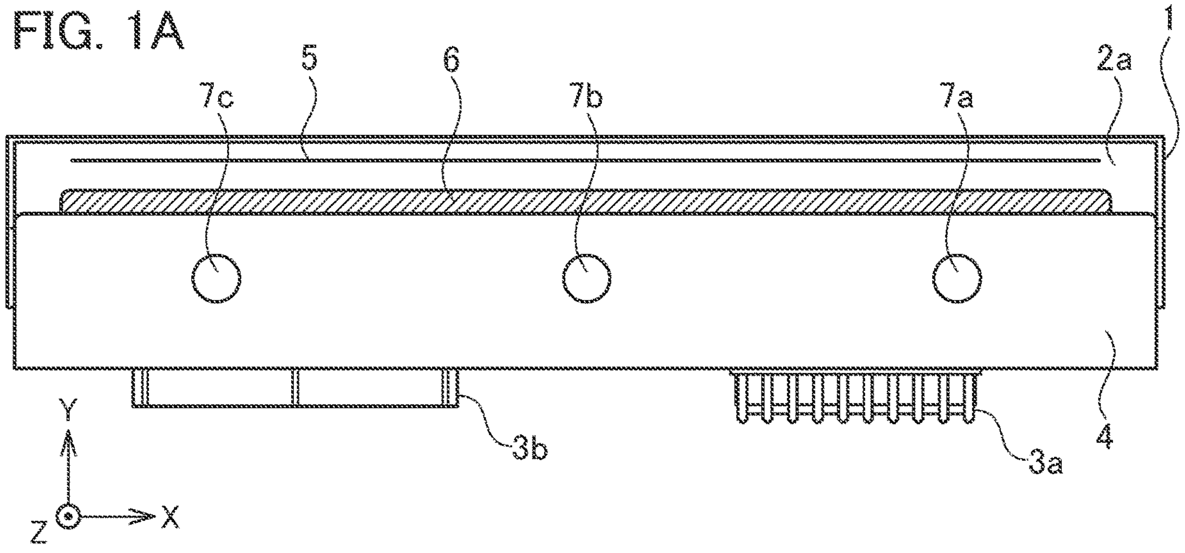
FIG. 1A is a top view illustrating the configuration of a thermal print head according to a plurality of embodiments.

Next, embodiments will be described in detail with reference to the drawings. In the description, the same components are denoted by the same reference numerals and a description thereof will be omitted.

First Embodiment

<Thermal Print Head>

The configuration of a thermal print head according to a first embodiment will be described with reference to FIG. 1A, FIG. 1B and FIG. 1C. The thermal print head includes a head substrate 2*a* on which a plurality of heating resistance units 5 (heating units) arranged in the main scanning direction (one direction: X direction) are formed, and a heat sink 1 thermally connected to the head substrate 2*a*.

Various metal electrodes are arranged on the head substrate 2*a*, and the various metal electrodes include common electrodes electrically connected to the heating resistance units 5, individual electrodes electrically connected to the common electrodes via the heating resistance units 5, high potential electrodes, and ground electrodes; however, these metal electrodes are not illustrated. A drive IC 6 is also arranged on the head substrate 2*a*. The drive IC 6 is electrically connected to the individual electrodes and controls the energizing operation of the heating resistance units 5. The drive IC 6 is covered with a protective film made of resin.

The heat sink 1 is made of aluminum, for example, and radiates heat generated on the head substrate 2*a* to the outside of the thermal print head. The head substrate 2*a* and a connection substrate 2*b* are connected to the heat sink 1, and the connector terminals 3*a* and 3*b* are connected to the connection substrate 2*b*. The drive IC 6 is electrically connected to the connector terminals 3*a* and 3*b* via wiring on the connection substrate 2*b*. The drive IC 6 drives the heating resistance units 5 to generate heat selectively based on control signals input from the connector terminals 3*a* and 3*b*.

Figure 1B:
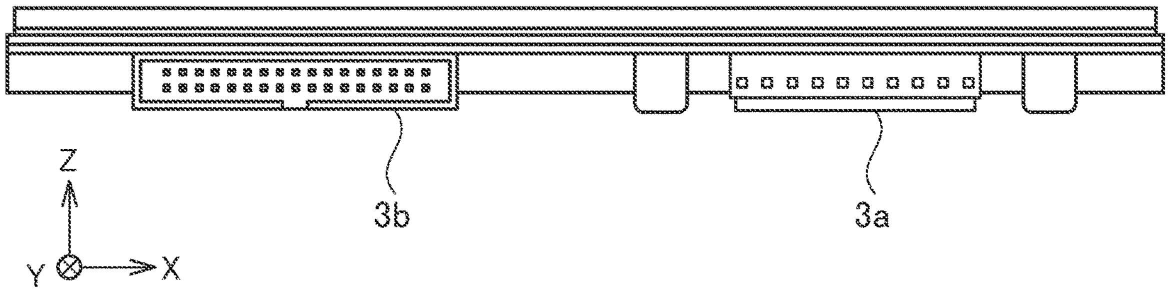
FIG. 1B is a side view illustrating a side surface of the thermal print head in FIG. 1A in a main scanning direction (X direction).
Figure 1C:
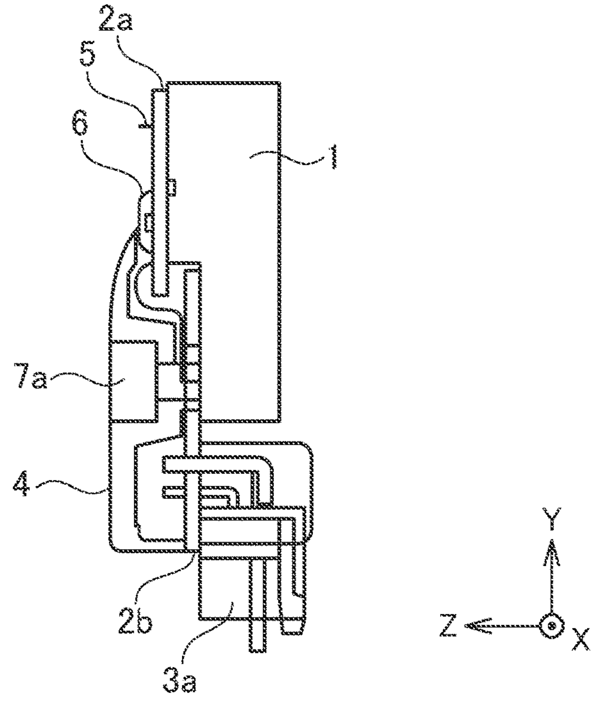
FIG. 1C is a side view illustrating the side surface of the connector terminal 3*a* and 3*b* side of the thermal print head in FIG. 1A.

A protective cover 4 made of resin is arranged on the upper side of the head substrate 2*a* and the connection substrate 2*b* (Z direction in FIG. 1C). The connection substrate 2*b* and the protective cover 4 are fixed to the heat sink 1 by three male screws 7*a* to 7*c*.

The thermal printer according to a plurality of embodiments includes the thermal print head illustrated in FIGS. 1A to 1C, and a printer body to which the thermal print head is attached. In the plurality of embodiments, a conventional screw-fastening method is replaced by a magnetic fixing method in which the thermal print head is fixed to the printer body by using the magnetic force of a magnet. The use of the magnetic fixing method eliminates the need to align the thermal print head with the printer body. A recess is formed in the surface (back surface) of the heat sink 1 in contact with the printer body, and a metal member is attached in the recess. The metal member exhibits magnetism by bringing the heat sink 1 close to a magnet provided in the printer body, and thus the thermal print head is fixed to the printer body.

<Heat Sink>

The heat sink 1, and metal members and an adhesive provided in the thermal print head according to the first embodiment will be described with reference to FIGS. 2A to 2D.

Figure 2A:
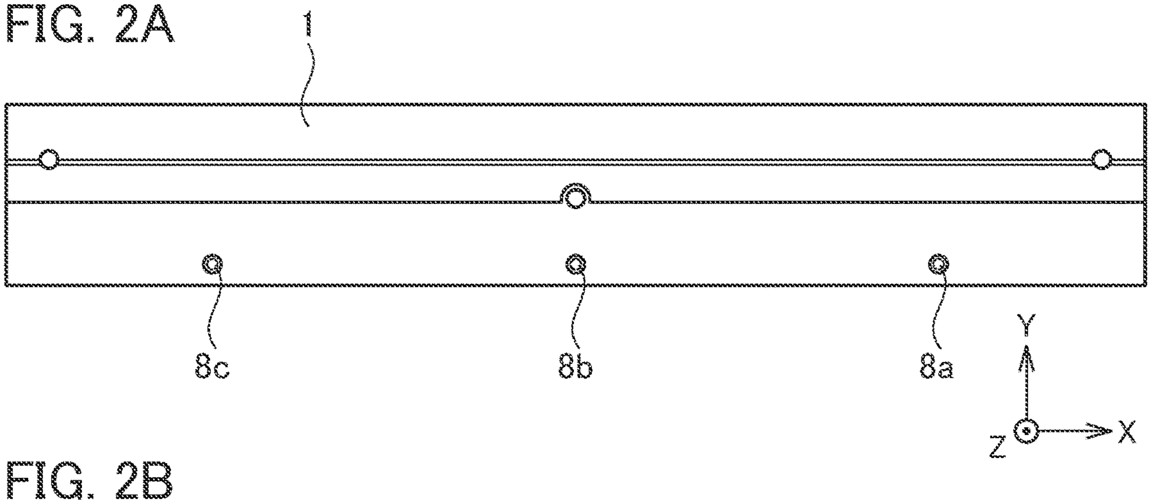
FIG. 2A is a top view illustrating only a heat sink 1 of the components of the thermal print head illustrated in FIG. 1A.
Figure 2B:
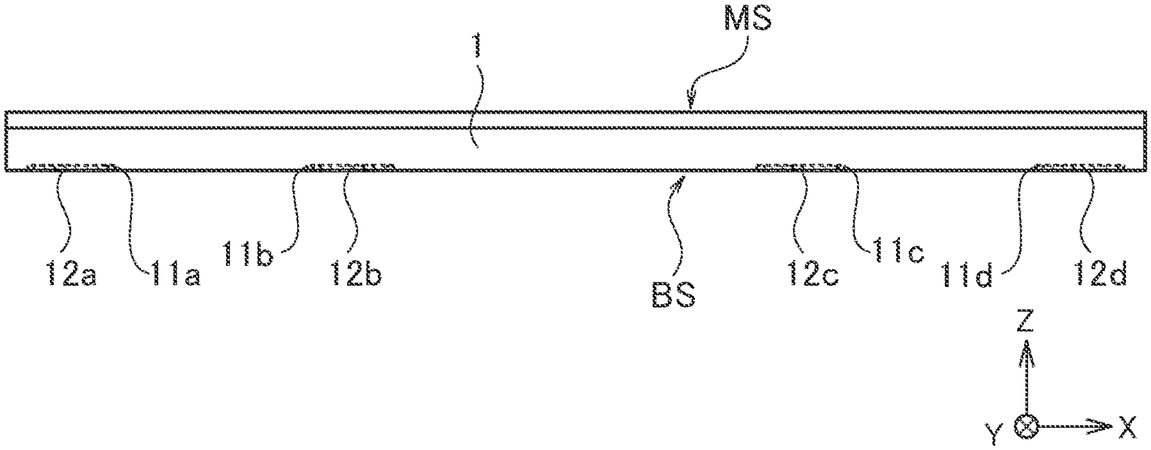
FIG. 2B is a side view illustrating a side surface of the heat sink 1 in FIG. 2A in the main scanning direction (X direction).
Figure 2C:
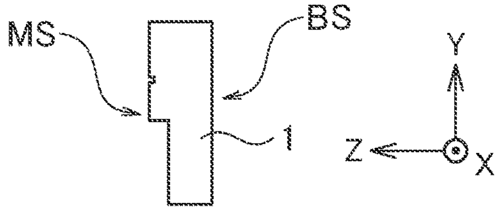
FIG. 2C is a side view illustrating the side surface of the connector terminal 3*a* and 3*b* side of the heat sink 1 in FIG. 2A.
Figure 2D:
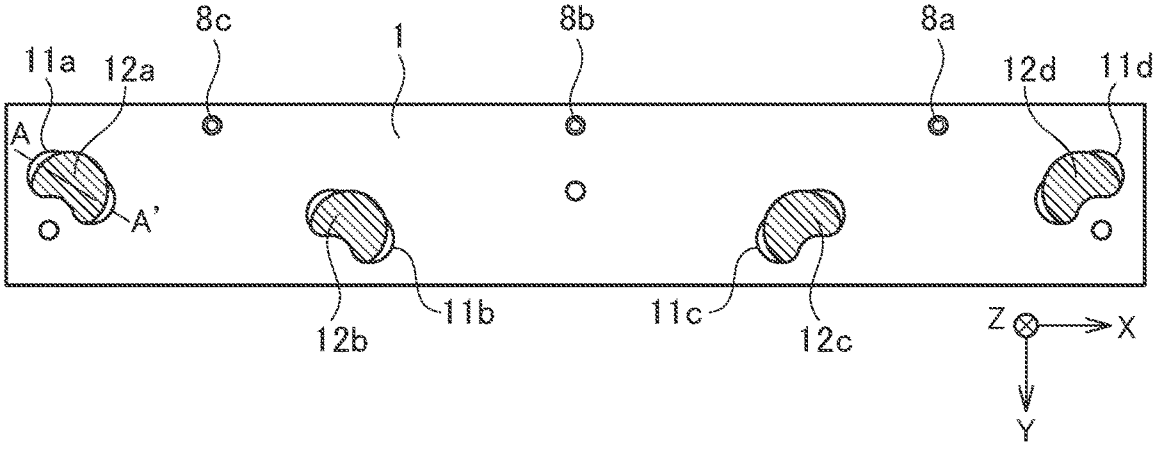
FIG. 2D is a bottom view illustrating a back surface which faces a front surface of the heat sink 1 illustrated in FIG. 2A.

As illustrated in FIG. 2B, FIG. 2C and FIG. 2D, recesses 11*a* to 11*d* are formed in the back surface (BS) of the heat sink 1, which faces the surface (MS) to which the head substrate 2*a* illustrated in FIG. 1A and FIG. 1C is connected. The thermal print head according to the first embodiment further includes metal members 12*a* to 12*d* arranged in the recesses 11*a* to 11*d*.

The metal members 12*a* to 12*d* are formed of a ferromagnetic body that exhibits magnetism strong enough to fix the entire thermal print head to the printer body by bringing the metal members 12*a* to 12*d* close to magnets attached to the mounting surface of the printer body. The metal members 12*a* to 12*d* are made of, for example, a cold-rolled steel sheet (steel plate cold commercial (SPCC)). The surfaces of the metal members 12*a* to 12*d* may be galvanized to prevent rust formation.

In the first embodiment, although four recesses 11*a* to 11*d* and four metal members 12*a* to 12*d* are illustrated as an example, the number of recesses and metal members is not limited to four and may be one, two, three, or five or more. When the number of recesses and metal members is more than one, the recesses 11*a* to 11*d* and metal members 12*a* to 12*d* are arranged in the main scanning direction (X direction). However, it is not necessary to consider the positions of the recesses 11*a* to 11*d* and the metal members 12*a* to 12*d* in the sub-scanning direction (Y direction). That is, these may or may not correspond with each other.

FIG. 2D illustrates an example in which the shapes of the four recesses 11*a* to 11*d* and the metal members 12*a* to 12*d* correspond with each other when viewed from the direction perpendicular to the back surface (BS) of the heat sink 1 (Z direction). However, as will be described later, the inner circumferences of the recesses may be different from each other in the same heat sink 1. For the same reason, the outer circumferences of the metal members may be different from each other.

The three male screws 7*a* to 7*c* in FIG. 1A are screwed into female screws 8*a* to 8*c* formed in the heat sink 1.

<Recess and Metal Member>

The structure of the recess 11*a* and the metal member 12*a* taken along the A-A' cross section of FIG. 2D will be described with reference to FIG. 3. In the following description of the first embodiment, the recess 11*a* and the metal member 12*a* are taken as an example; however, the other recesses 11*b* to 11*d* and the other metal members 12*b* to 12*d* have the same structures as those of the recess 11*a* and the metal member 12*a*.

The thermal print head according to the first embodiment further includes an adhesive 13 arranged between the bottom surface of the recess 11*a* and the metal member 12*a*. The adhesive 13 is used to attach the metal member 12*a* in the recess 11*a*. The inside of the recess 11*a* includes an area where the metal member 12*a* is arranged and two groove areas 14*a* and 14*b* where the metal member 12*a* is not arranged. The two groove areas 14*a* and 14*b* are arranged in the A-A' cross section at positions in such a way as to sandwich the metal member 12*a*.

Portions of the adhesive 13 are arranged in the groove areas 14*a* and 14*b*. Specifically, portions of the adhesive 13 are arranged on the bottom surfaces of the groove areas 14*a* and 14*b*. During the attachment of the metal member 12*a* into the recess 11*a*, the adhesive 13 which protrudes from the gap between the metal member 12*a* and the bottom surface of the recess 11*a* into the groove areas 14*a* and 14*b* corresponds to the portions of the adhesive 13 arranged in the groove areas 14*a* and 14*b*.

Figure 3:
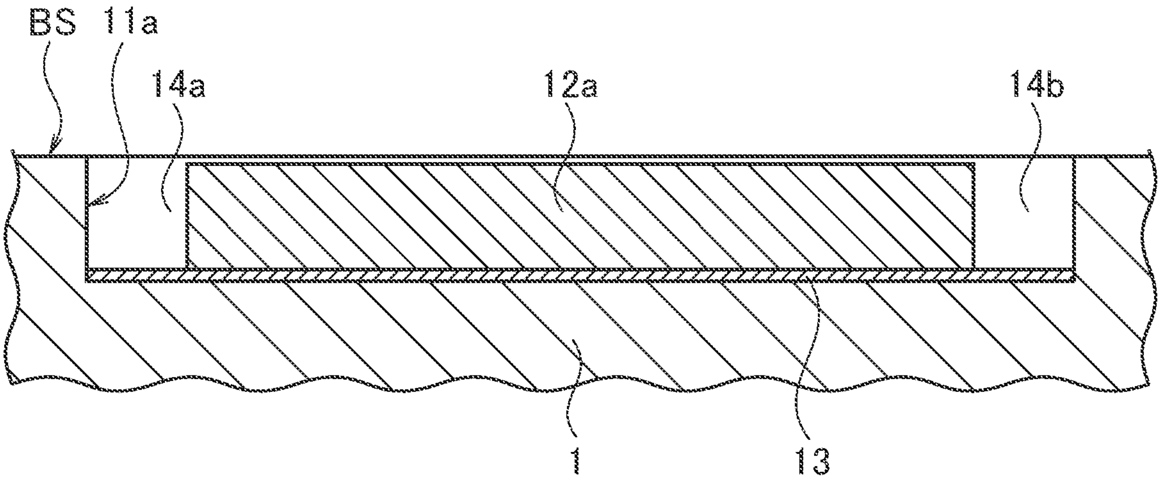
FIG. 3 is a cross-sectional view illustrating the structure of a recess 11*a* and a metal member 12*a* taken along an A-A' cross section of FIG. 2D.
Figure 4:
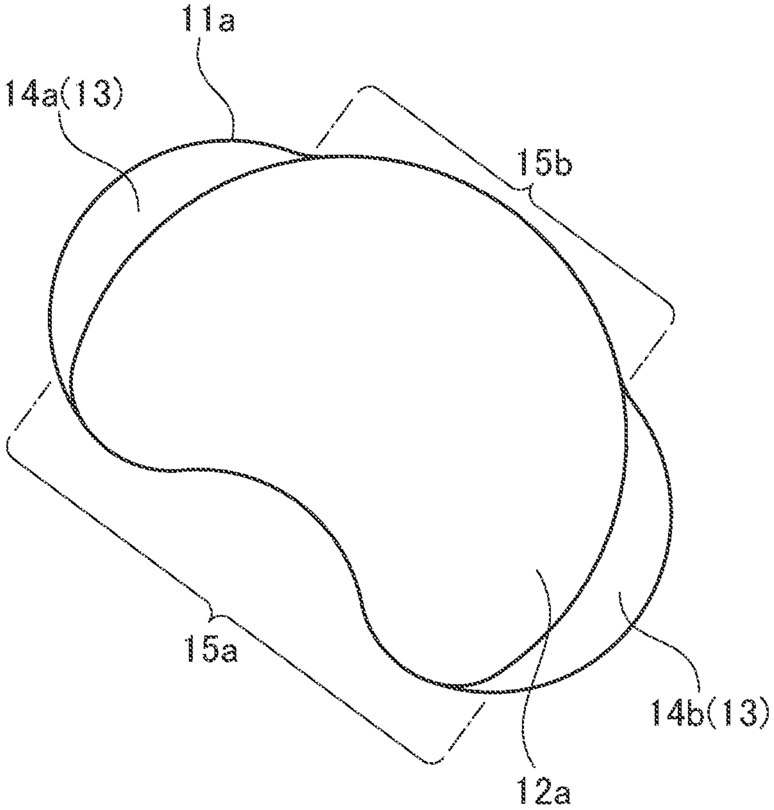
FIG. 4 is an enlarged plan view of the recess 11*a* and the metal member 12*a* illustrated in FIG. 2D.

FIG. 4 is an enlarged plan view of the recess 11*a* and the metal member 12*a* viewed from the direction perpendicular to the back surface (BS) of the heat sink 1 (Z direction). As illustrated in FIG. 4, the recess 11*a* viewed from the direction perpendicular to the back surface (BS) of the heat sink 1 (Z direction) includes an area where the metal member 12*a* is arranged and the groove areas 14*a* and 14*b* where the metal member 12*a* is not arranged. Portions of the protruding adhesive 13 are arranged on the bottom surfaces of the groove areas 14*a* and 14*b*. Accordingly, the portions of the adhesive 13 arranged on the bottom surfaces of the groove areas 14*a* and 14*b* can be visually checked from the direction perpendicular to the back surface (BS) of the heat sink 1 (Z direction). Thus, since the portions of the adhesive 13 which have protruded into the groove areas 14*a* and 14*b* can be visually checked from the direction perpendicular to the back surface (BS) of the heat sink (Z direction), it is possible to reduce an insufficiency in adhesive strength of the metal member 12*a* and restrict the metal member 12*a* from falling off the heat sink 1, which are caused by the amount of the adhesive 13 being too little. Meanwhile, even when the amount of the adhesive 13 is too large, the excess adhesive 13 is stored in the groove areas 14*a* and 14*b* and hardly leaks onto the back surface (BS) of the heat sink 1 as illustrated in FIG. 3. This eliminates the need for wiping off the excess adhesive 13, which makes it possible to suppress various malfunctions caused by variations in the amount of adhesive 13.

As illustrated in FIG. 4, the inner circumference of the recess 11*a* viewed from the direction perpendicular to the back surface (BS) (Z direction) includes a plurality of positioning sections 15*a* and 15*b* in contact with the outer circumference of the metal member 12*a*. That is, a portion of the inner circumferential shape of the recess 11*a* corresponds with the outer circumferential shape of the metal member 12*a* to the extent allowed by the machining accuracy of the inner circumference of the recess 11*a* and the outer circumference of the metal member 12*a*. Since the plurality of positioning sections 15*a* and 15*b* in contact with the outer circumference of the metal member 12*a* are provided in portions of the inner circumference of the recess 11*a*, the in-plane position of the metal member 12*a* with respect to the recess 11*a* can be determined.

As illustrated in FIG. 4, the inner circumference of the recess 11*a* viewed from the direction perpendicular to the back surface (BS) (Z direction) further includes separation sections 14*a* and 14*b* separated from the outer circumference of the metal member 12*a*. Since the inner circumference of the recess 11*a* includes the positioning sections 15*a* and 15*b* and the separation sections 14*a* and 14*b*, the metal member 12*a* can be positioned. In addition, it is possible to eliminate the need for wiping off the excess adhesive 13, and restrict the metal member 12*a* from falling off.

The separation sections 14*a* and 14*b* correspond to the groove areas 14*a* and 14*b* illustrated in FIG. 3. Since the excess adhesive 13 which has protruded is stored in the groove areas 14*a* and 14*b*, leakage onto the back surface (BS) of the heat sink 1 is suppressed. Meanwhile, it is possible to reduce an insufficiency in adhesive strength and restrict the metal member from falling off by visually checking the presence or absence of the excess adhesive 13 which has protruded to the separation sections 14*a* and 14*b*, from the direction perpendicular to the back surface (BS) (Z direction).

As illustrated in FIG. 3 and FIG. 4, the two groove areas 14*a* and 14*b* are arranged at positions in such a way as to sandwich the metal member 12*a*. It is possible to check that the adhesive strength between the metal member 12*a* and the bottom surface of the recess 11*a* is sufficiently high by visually checking the adhesive which has protruded into the two groove areas 14*a* and 14*b* sandwiching the metal member 12*a* therebetween.

Second Embodiment

Other embodiments in which the recesses and the metal members have different shapes will be described below. The overall configuration of the thermal print head according to a second embodiment is the same as the overall configuration of the thermal print head of the first embodiment illustrated in FIGS. 1A to 1C and FIGS. 2A to 2C and a description thereof will be omitted.

Figure 5:
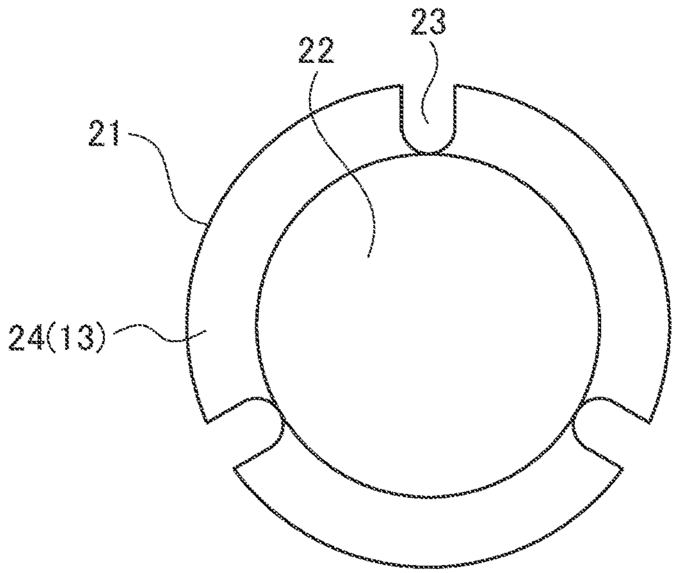
FIG. 5 is an enlarged plan view of a recess 21 and a metal member 22 according to a second embodiment.

As illustrated in FIG. 5, the thermal print head according to the second embodiment includes one or more recesses 21 and a metal member 22 arranged in the recess 21 instead of the recesses 11*a* to 11*d* and the metal members 12*a* to 12*d* illustrated in FIG. 2D and FIG. 4.

The outer circumference of the metal member 22 viewed from the direction perpendicular to the back surface (BS) of the heat sink 1 (Z direction) has a true circle shape. Meanwhile, the inner circumference of the recess 21 has a true circle shape having a diameter longer than that of the outer circumference of the metal member 22, and includes three protrusion-like positioning sections 23 at approximately 120-degree intervals with respect to the center of the true circle. The respective front edges of the three positioning sections 23 are in contact with the outer circumference of the metal member 22.

The inner circumference of the recess 21, which excludes the positioning sections 23, forms separation sections 24. The cross-sectional shapes of the recess 21 and the metal member 22 illustrated in FIG. 5 are almost the same as those illustrated in FIG. 3. That is, the recess 21 includes an area where the metal member 22 is arranged and a groove area 24 where the metal member 22 is not arranged. An adhesive 13 is arranged between the bottom surface of the recess 21 and the metal member 22. A portion of the adhesive 13 is arranged in the groove area 24.

The inner circumference of the recess 21 and the outer circumference of the metal member 22 are not limited to a true circle shape and may be elliptical. The number of protrusion-like positioning sections 23 is not limited to three, and may be four or more. Further, the number of protrusion-like positioning sections 23 may be one or two. However, in this case, in order to position the metal member 22, it is desirable that the outer circumference of the metal member 22 be in contact with a portion of the inner circumference of the recess 21 that does not protrude.

The other matters are the same as those of the first embodiment and a description thereof will be omitted. Even with the recess 21 and the metal member 22 according to the second embodiment described above, the same operational effect as in the first embodiment can be obtained.

Third Embodiment

A description will be given regarding a third embodiment in which the recesses and the metal members have different planar shapes. The overall configuration of the thermal print head according to the third embodiment is the same as that of the first embodiment illustrated FIGS. 1A to 1C and FIGS. 2A to 2C and a description thereof will be omitted.

Figure 6:
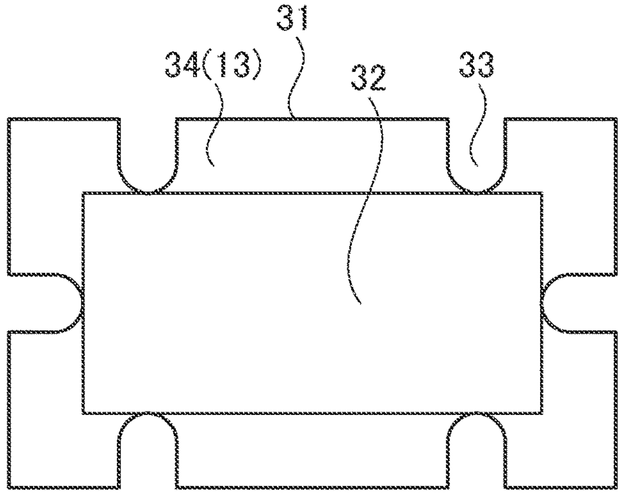
FIG. 6 is an enlarged plan view of a recess 31 and a metal member 32 according to a third embodiment.

As illustrated in FIG. 6, the thermal print head according to the third embodiment includes one or more recesses 31 and a metal member 32 arranged in the recess 31 instead of the recesses 11*a* to 11*d* and the metal members 12*a* to 12*d* illustrated in FIG. 2D and FIG. 4.

The outer circumference of the metal member 32 viewed from the direction perpendicular to the back surface (BS) of the heat sink 1 (Z direction) has a rectangular shape.

Meanwhile, the inner circumference of the recess 31 has a rectangular shape having four sides longer than those of the metal member 32 and includes six protrusion-like positioning sections 33. The respective front edges of the six positioning sections 33 are in contact with the outer circumference of the metal member 32. Specifically, in the outer circumference of the metal member 32, two positioning sections 33 are in contact with each of the two long sides and one positioning section 33 is in contact with each of the two short sides.

The inner circumference of the recess 31 which excludes the positioning sections 33 forms separation sections 34. The cross-sectional shapes of the recess 31 and the metal member 32 illustrated in FIG. 6 are almost the same as those illustrated in FIG. 3. That is, the recess 21 includes an area where the metal member 32 is arranged and a groove area 34 where the metal member 32 is not arranged. An adhesive 13 is arranged between the bottom surface of the recess 31 and the metal member 32. A portion of the adhesive 13 is arranged in the groove area 34.

The inner circumference of the recess 31 and the outer circumference of the metal member 32 are not limited to a rectangular shape and may be a square shape. The number of protrusion-like positioning sections 33 is not limited to six. In order to position the metal member 32, it is desirable that the outer circumference of the metal member 32 be in contact with a portion of the inner circumference of the recess 31 that does not protrude.

The other matters are the same as those of the first embodiment and a description thereof will be omitted. Even with the recess 31 and the metal member 32 according to the third embodiment described above, the same operational effect as in the first embodiment can be obtained.

Fourth Embodiment

A description will be given regarding a fourth embodiment in which the recesses and the metal members have different planar shapes. The overall configuration of the thermal print head according to the fourth embodiment is the same as that of the first embodiment illustrated in FIGS. 1A to 1C and FIGS. 2A to 2C and a description thereof will be omitted.

Figure 7:
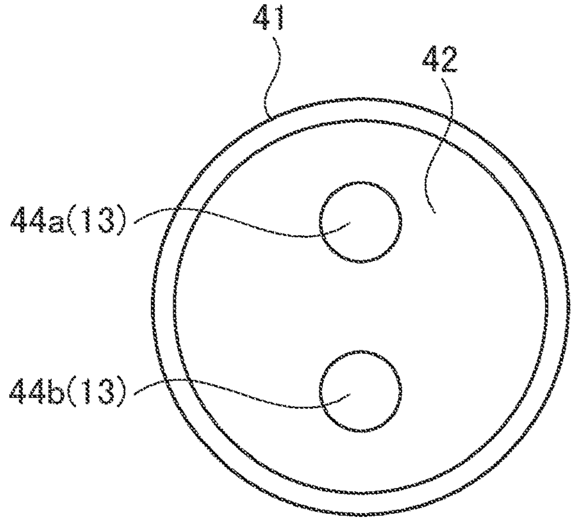
FIG. 7 is an enlarged plan view of a recess 41 and a metal member 42 according to a fourth embodiment.

As illustrated in FIG. 7, the thermal print head according to the fourth embodiment includes one or more recesses 41 and a metal member 42 arranged in the recess 41 instead of the recesses 11*a* to 11*d* and metal members 12*a* to 12*d* illustrated in FIG. 2D and FIG. 4.

The outer circumference of the metal member 42 viewed from the direction perpendicular to the back surface (BS) of the heat sink 1 (Z direction) has a true circle shape. Meanwhile, the inner circumference of the recess 41 has a true circle shape having a diameter approximately equal to that of the outer circumference of the metal member 42. The meaning of "approximately equal" is to allow a dimensional difference to the extent that the metal member 42 can be arranged in the recess 41. The inner circumference of the recess 41 is in contact with the outer circumference of the metal member 42, and there is no portion corresponding to the groove areas 14*a* and 14*b* illustrated in FIG. 4 between the inner circumference of the recess 41 and the outer circumference of the metal member 42. Alternatively, the metal member 42 includes two through-holes 44*a* and 44*b*. By attaching the metal member 42 into the recess 41, the two through-holes 44*a* and 44*b* form the groove areas 44*a* and 44*b* where the metal member 42 is not arranged, and portions of the adhesive 13 are arranged in the groove areas 44*a* and 44*b*. In other words, the groove areas 44*a* and 44*b* are surrounded by the metal member 42. It is possible to make excess adhesive protrude into the through-holes (groove areas).

The inner circumference of the recess 41 and the outer circumference of the metal member 42 are not limited to a true circle shape and may be an oval or a square shape. Similarly, the through-holes 44*a* and 44*b* are not limited to a true circle shape and may be an oval or a square shape. The number of through-holes 44*a* and 44*b* is not limited to two and may be one or three or more.

The other matters are the same as those of the first embodiment and a description thereof will be omitted. Even with the recess 41 and the metal member 42 according to the fourth embodiment described above, the same operational effect as in the first embodiment can be obtained.

Fifth Embodiment

A description will be given regarding a fifth embodiment in which the recesses and the metal members have different planar shapes. The overall configuration of the thermal print head according to the fifth embodiment is the same as that of the first embodiment illustrated in FIGS. 1A to 1C and FIGS. 2A to 2C and a description thereof will be omitted.

Figure 8:
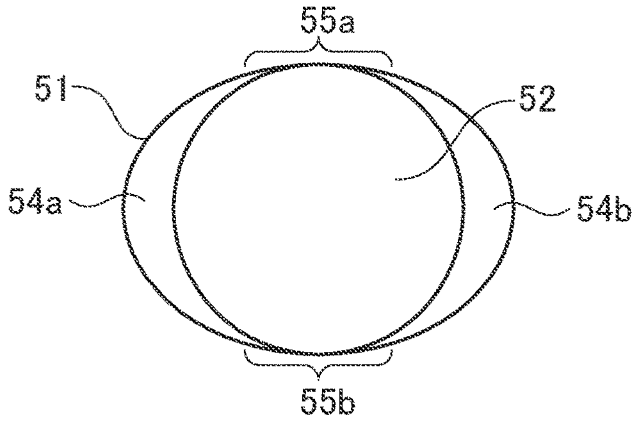
FIG. 8 is an enlarged plan view of a recess 51 and a metal member 52 according to a fifth embodiment.

As illustrated in FIG. 8, the thermal print head according to the fifth embodiment includes one or more recesses 51 and a metal member 52 arranged in the recess 51 instead of the recesses 11*a* to 11*d* and metal members 12*a* to 12*d* illustrated in FIG. 2D and FIG. 4.

The outer circumference of the metal member 52 viewed from the direction perpendicular to the back surface (BS) of the heat sink 1 (Z direction) has a true circle shape. Meanwhile, the inner circumference of the recess 51 has an oval shape having a longer diameter than the diameter of the true circle of the metal member 22 and a minor radius approximately equal to the diameter of the true circle of the metal member 22.

The recess 51 viewed from the direction perpendicular to the back surface (BS) of the heat sink 1 (Z direction) includes an area where the metal member 52 is arranged and groove areas 54*a* and 54*b* where the metal member 52 is not arranged. Portions of the protruding adhesive 13 are arranged on the bottom surfaces of the groove areas 54*a* and 54*b*. The two groove areas 54*a* and 54*b* are arranged at positions in such a way as to sandwich the metal member 52.

The inner circumference of the recess 51 viewed from the direction perpendicular to the back surface (BS) (Z direction) includes a plurality of positioning sections 55*a* and 55*b* in contact with the outer circumference of the metal member 52, and separation sections 54*a* and 54*b* separated from the outer circumference of the metal member 52. The two groove areas 54*a* and 54*b* are arranged at positions in such a way as to sandwich the metal member 52.

The other matters are the same as those of the first embodiment and a description thereof will be omitted. Even with the recess 51 and the metal member 52 according to the fifth embodiment described above, the same operational effect as in the first embodiment can be obtained.

Sixth Embodiment

A description will be given regarding a sixth embodiment in which the recesses and the metal members have different planar shapes. The overall configuration of the thermal print head according to the sixth embodiment is the same as that of the first embodiment illustrated in FIGS. 1A to 1C and FIGS. 2A to 2C and a description thereof will be omitted.

Figure 9:
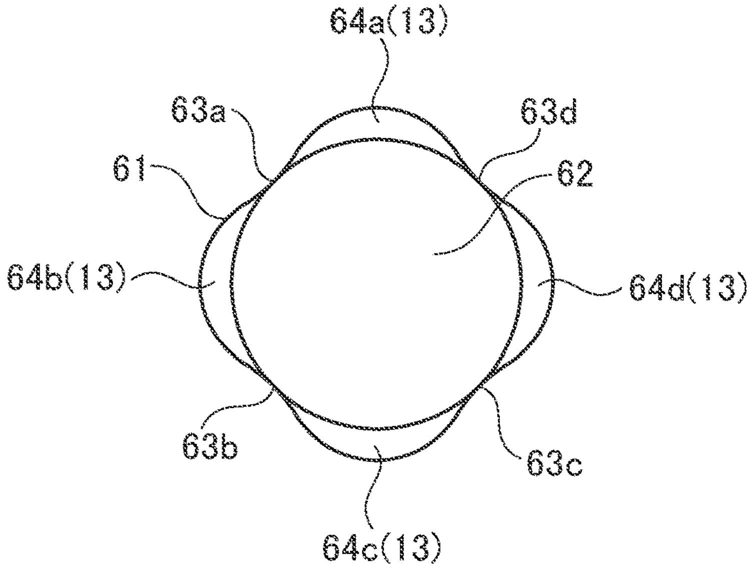
FIG. 9 is an enlarged plan view of a recess 61 and a metal member 62 according to a sixth embodiment.

As illustrated in FIG. 9, the thermal print head according to the sixth embodiment includes one or more recesses 61 and a metal member 62 arranged in the recess 61 instead of the recesses 11*a* to 11*d* and the metal members 12*a* to 12*d* illustrated in FIG. 2D and FIG. 4.

The recess 61 viewed from the direction perpendicular to the back surface (BS) of the heat sink 1 (Z direction) includes an area where the metal member 62 is arranged and groove areas 64*a* to 64*d* where the metal member 62 is not arranged. Portions of the protruding adhesive 13 are arranged on the bottom surfaces of the groove areas 64*a* to 64*d*.

The outer circumference of the metal member 62 viewed from the direction perpendicular to the back surface (BS) of the heat sink 1 (Z direction) has a true circle shape. Meanwhile, the inner circumference of the recess 61 includes four positioning sections 63*a* to 63*d* in contact with the outer circumference of the metal member 62, and separation sections 64 separated from the outer circumference of the metal member 62. A portion of the inner circumferential shape of the recess 61 corresponds with the outer circumferential shape of the metal member 62 to the extent allowed by the machining accuracy of the inner circumference of the recess 61 and the outer circumference of the metal member 62. The two groove areas 64*a* and 64*c* are arranged at positions in such a way as to sandwich the metal member 62. Similarly, the two groove areas 64*b* and 64*d* are arranged at positions in such a way as to sandwich the metal member 62.

The other matters are the same as those of the first embodiment and a description thereof will be omitted. Even with the recess 61 and the metal member 62 according to the sixth embodiment described above, the same operational effect as in the first embodiment can be obtained.

Seventh Embodiment

A description will be given regarding a seventh embodiment in which the recess has a different cross-sectional shape. The overall configuration of the thermal print head according to the seventh embodiment is the same as that of the first embodiment illustrated in FIGS. 1A to 1C and FIGS. 2A to 2C and a description thereof will be omitted. In addition, irrespective of the planar shapes of the recess and the metal member, the present embodiment can be implemented using the planar shapes described in the first to sixth embodiments or a combination of modified examples of such planar shapes.

Figure 10:
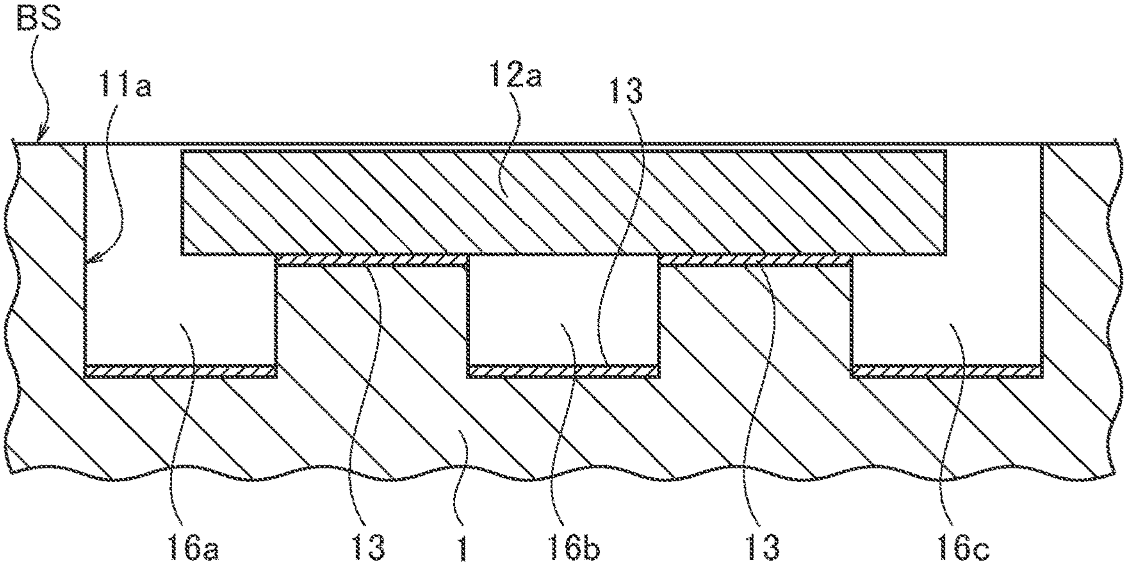
FIG. 10 is a cross-sectional view illustrating the structure of a recess 11*a* according to a seventh embodiment.

As illustrated in FIG. 10, the cross-sectional structure of the recess 11*a* according to the seventh embodiment is different from the cross-sectional structure of the recess 11*a* illustrated in FIG. 3. Hollows 16*a* to 16*c* are formed in portions of the bottom surface of the recess 11*a*. The hollows 16*a* to 16*c* are narrower in width than the recess 11*a*, and the plurality of hollows 16*a* to 16*c* are formed in one recess 11*a*. Portions of the adhesive 13 protruding from the gap between the bottom surface of the recess 11*a* and the metal member 12*a* are arranged not only in the groove areas 14*a* and 14*b*, but also in the hollows 16*a* to 16*c*. This increases the volume in which the protruding adhesive 13 can be stored, thereby making it possible to allow even greater variation in the amount of adhesive 13.

Further, the hollows 16*a* and 16*c* are superimposed on the groove areas 14*a* and 14*b* when viewed from the direction perpendicular to the back surface (BS) of the heat sink 1. The hollows 16*a* and 16*c* formed just below the groove areas 14*a* and 14*b* can be viewed from the direction perpendicular to the rear surface (BS) of the heat sink 1 (Z direction). Thus, excess adhesive 13 arranged in the hollows 16*a* and 16*c* can be visually checked.

Eighth Embodiment

A description will be given regarding an eighth embodiment in which the recesses and the metal members have different planar shapes. The overall configuration of the thermal print head according to the eighth embodiment is the same as that of the first embodiment illustrated in FIGS. 1A to 1C and a description thereof will be omitted.

Figure 11A:
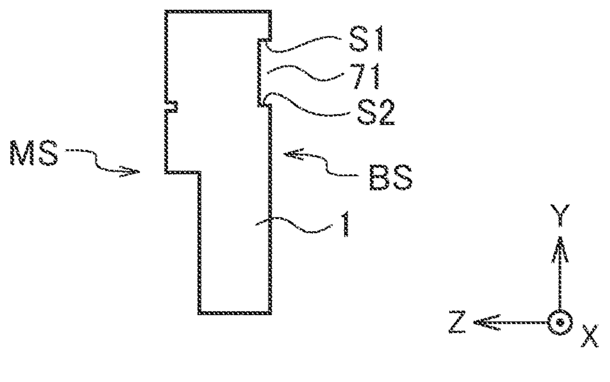
FIG. 11A is a side view illustrating a side surface of a heat sink 1 according to an eighth embodiment and a ninth embodiment in a main scanning direction (X direction).
Figure 11B:
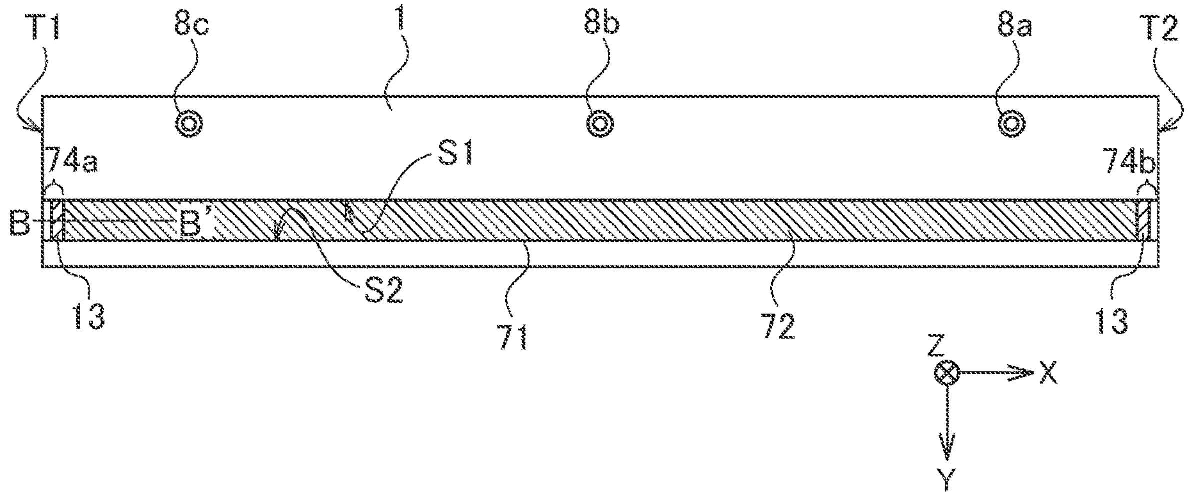
FIG. 11B is a bottom view illustrating the back surface (BS) of the heat sink 1 according to the eighth embodiment.

FIG. 11A is a side view illustrating a side surface of the heat sink 1 according to eighth and ninth embodiments in the main scanning direction (X direction). FIG. 11B is a bottom view illustrating the back surface (BS) of the heat sink 1 according to the eighth embodiment. The thermal print head according to the eighth embodiment includes one recess 71 illustrated in FIGS. 11A and 11B and one metal member 72 arranged in the recess 71 instead of the four recesses 11*a* to 11*d* and the four metal members 12*a* to 12*d* illustrated in FIG. 2B and FIG. 2D. FIG. 11A illustrates only the heat sink 1 and omits the metal member 72 and the adhesive 13.

The recess 71 extends along the main scanning direction (X direction) between both ends T1 and T2 of the heat sink 1 in the main scanning direction (X direction) in which a plurality of heating resistance units 5 are arranged. In other words, the recess 71 is provided with a pair of side surfaces S1 and S2 parallel to the main scanning direction (X direction) in which the plurality of heating resistance units 5 are arranged. The pair of side surfaces S1 and S2 is formed from the first end T1 in the X direction to the second end T2 in the X direction of the heat sink 1. Thus, portions of the inner circumference of the recess 71 are positioned at the first end T1 and the second end T2, and the remaining portion of the inner circumference of the recess 71 forms the pair of side surfaces S1 and S2 of the recess 71. In other words, the inner circumference of the recess 71 has a rectangular shape formed by the first and second ends T1 and T2 of the heat sink 1 in the X direction and the pair of side surfaces S1 and S2 of the recess 71.

Figure 11C:
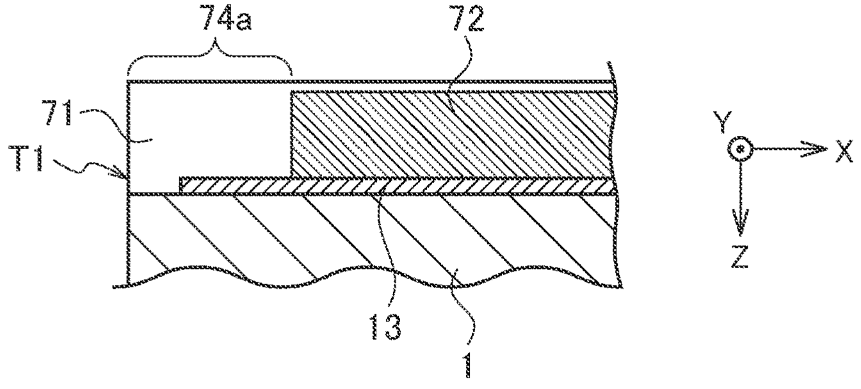
FIG. 11C is a cross-sectional view illustrating the structure of a recess 71 and a metal member 72 taken along a B-B' cross section of FIG. 11B.

FIG. 11C is a cross-sectional view illustrating the structure of the recess 71 and the metal member 72 taken along a B-B' cross section of FIG. 11B. As illustrated in FIG. 11B and FIG. 11C, the recess 71 viewed from the direction perpendicular to the back surface (BS) of the heat sink 1 (Z direction) includes an area where the metal member 72 is arranged and groove areas 74*a* and 74*b* where the metal member 72 is not arranged. The metal member 72 is arranged at the center of the recess 71 in the X direction, and the groove areas 74*a* and 74*b* are the areas including the first end T1 and the second end T2 of the heat sink 1, respectively. The adhesive 13 is arranged between the bottom surface of the recess 71 and the metal member 72. Further, portions of the adhesive 13 which protrude in the X direction from the area where the metal member 72 is arranged are arranged on the bottom surfaces of the groove areas 74*a* and 74*b*. Accordingly, portions of the adhesive 13 arranged on the bottom surfaces of the groove areas 74*a* and 74*b* can be visually checked from the direction perpendicular to the back surface (BS) of the heat sink 1 (Z direction). Although FIG. 11C illustrates only the groove 74*a* and omits the groove area 74*b*, the groove area 74*b* has a structure symmetrical to the groove area 74*a* on the YZ plane.

The center of the pair of side surfaces S1 and S2 forms two positioning sections in contact with the long sides of the metal member 72. That is, the distance between the pair of side surfaces S1 and S2 corresponds with the length of the metal member 72 in the Y-axis direction to the extent allowed by the machining accuracy of the recess 71 and the metal member 72. Thus, the in-plane position of the metal member 72 with respect to the recess 71 can be determined.

The inner circumference of the recess 71 viewed from the direction perpendicular to the back surface (BS) (Z direction), specifically both ends of the side surfaces S1 and S2 and the side surfaces S1 and S2, forms the separation sections 74*a* and 74*b* separated from the outer circumference of the metal member 72. Since the inner circumference of the recess 71 includes the positioning sections and the separation sections 74*a* and 74*b*, the metal member 72 can be positioned. In addition, it is possible to eliminate the need for wiping off the excess adhesive 13, and restrict the metal member 72 from falling off.

The groove areas 74*a* and 74*b* are open at the first end T1 and the second end T2. For this reason, it is desirable that the amount of the protruding adhesive 13 be limited to an amount with which the protruding adhesive 13 does not reach the first end T1 and the second end T2. Alternatively, it is desirable that the widths of the groove areas 74*a* and 74*b* in the X direction be such that the protruding adhesive 13 does not reach the first end T1 and the second end T2. This makes it possible to suppress the adhesive 13 from protruding from the first end T1 and the second end T2, thereby eliminating the need for wiping off the adhesive 13.

As described above, the recess 71 is provided with a pair of side surfaces parallel to the main scanning direction (X direction) where a plurality of heating resistance units 5 are arranged, and the pair of side surfaces is formed from the first end in the X direction to the second end in the X direction of the heat sink 1. In other words, in the optional cross section perpendicular to the X direction, the heat sink 1 has the cross-sectional shape illustrated in FIG. 11A. As a result, the recess 71 can be formed at the time when the heat sink 1 is manufactured by extruding the heated material from the opening of a die having the same shape as that of FIG. 11A. After the heat sink 1 without the recess is first manufactured, it becomes unnecessary to form the recess in another process such as a cutting process. Thus, since the recess 71 can also be formed by extrusion in the X direction, the manufacturing process of the heat sink 1 is simplified. The other matters are the same as those of the first embodiment and a description thereof will be omitted. Even with the recess 71 and the metal member 72 according to the eighth embodiment described above, the same operational effect as in the first embodiment can be obtained.

Ninth Embodiment

A description will be given regarding a ninth embodiment in which the recesses and the metal members have different planar shapes. The overall configuration of the thermal print head according to the ninth embodiment is the same as that of the first embodiment illustrated in FIGS. 1A to 1C and a description thereof will be omitted.

Figure 12A:
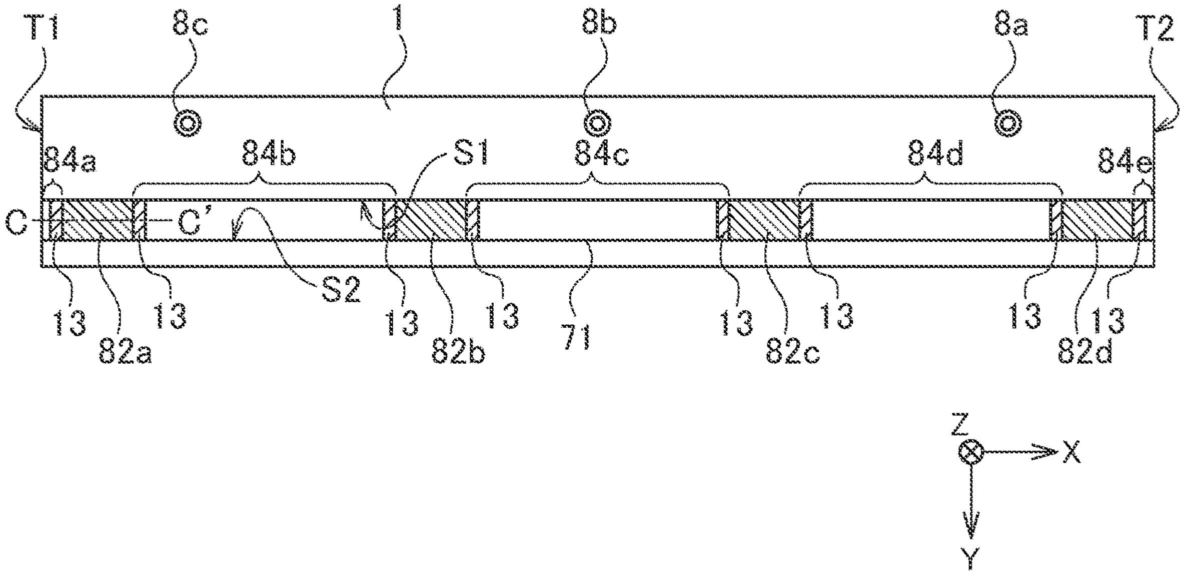
FIG. 12A is a bottom view illustrating the back surface (BS) of the heat sink 1 according to the ninth embodiment.

FIG. 12A is a bottom view illustrating the back surface (BS) of the heat sink 1 according to the ninth embodiment. The thermal print head according to the ninth embodiment includes one recess 71 illustrated in FIG. 12A and four metal members 82*a*, 82*b*, 82*c* and 82*d* arranged in the recess 71 instead of the four recesses 11*a* to 11*d* and the four metal members 12*a* to 12*d* illustrated in FIGS. 2B and 2D. The recess 71 in the ninth embodiment is the same as the recess 71 described in the eighth embodiment and a description thereof will be omitted.

In the ninth embodiment, the four metal members 82*a* to 82*d* are arranged in such a way as to be spaced apart from each other in the recess 71. The metal member 82*a* closest to the first end T1 is spaced apart from the first end T1. The metal member 82*d* closest to the second end T2 is spaced apart from the second end T2. Thus, the recess 71 viewed from the direction perpendicular to the back surface (BS) of the heat sink 1 (Z direction) is divided into the areas where the four metal members 82*a* to 82*d* are arranged and the five groove areas 84*a*, 84*b*, 84*c*, 84*d* and 84*e*. Portions of the adhesive 13 protruding from the bottom surfaces of the metal members 82*a* to 82*d* are arranged in the five groove areas 84*a* to 84*e*. The number of metal members 82*a* to 82*d* is not limited to four and may be two, three, or five or more.

Figure 12B:
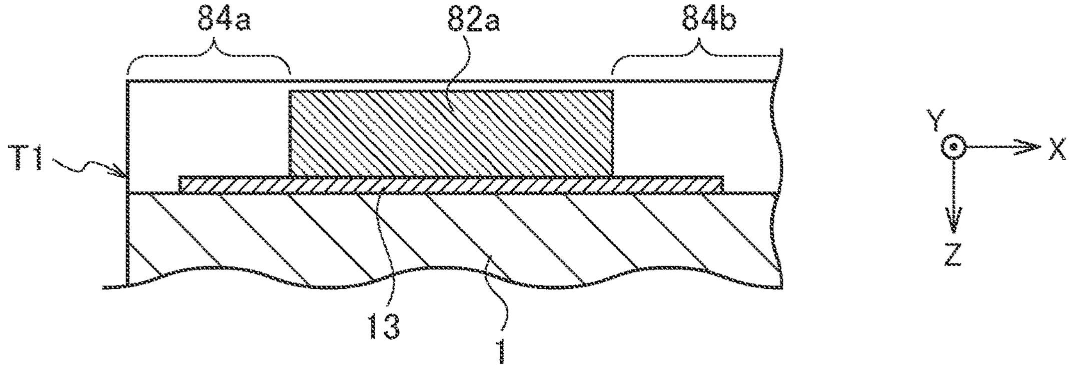
FIG. 12B is a cross-sectional view illustrating the structure of the recess 71 and a metal member 82*a* taken along a C-C' cross section of FIG. 12A.

FIG. 12B is a cross-sectional view illustrating the structure of the recess 71 and the metal member 82*a* taken along a C-C' cross section of FIG. 12A. FIG. 12B illustrates only the metal member 82*a* and the groove areas 84*a* and 84*b* around the metal member 82*a*, and does not illustrate the other metal members 82*b* to 82*e* and the groove areas 84*b* to 84*e* around the other metal members 82*b* to 82*e*. However, the other metal members 82*b* to 82*e* and the groove areas 84*b* to 84*e* also have similar structures to the metal member 82*a* and the groove areas 84*a* and 84*b*, respectively. An adhesive 13 is arranged between the bottom surface of the recess 71 and the metal members 82*a* to 82*d*. Further, portions of the adhesive 13 which protrude in the X direction from the area where the metal member 72 is arranged are arranged on the bottom surfaces of the groove areas 84*a* to 84*e*. Accordingly, portions of the adhesive 13 arranged on the bottom surfaces of the groove areas 84*a* to 84*e* can be visually checked from the direction perpendicular to the back surface (BS) of the heat sink 1 (Z direction).

Portions of the pair of side surfaces S1 and S2 form the positioning sections in contact with the respective long sides of the metal members 82*a* to 82*d*. That is, the distance between the pair of side surfaces S1 and S2 corresponds with the length of the metal members 82*a* to 82*d* in the Y direction to the extent allowed by the machining accuracy of the recess 71 and the metal members 82*a* to 82*d*. Thus, the in-plane position of the metal members 82*a* to 82*d* with respect to the recess 71 can be determined.

The inner circumference of the recess 71 viewed from the direction perpendicular to the back surface (BS) (Z direction), specifically the portions of the side surfaces S1 and S2 which are not in contact with the metal members 82*a* to 82*d* and the side surfaces S1 and S2, further includes separation sections 84*a* to 84*e* separated from the outer circumference of the metal member 72. Since the inner circumference of the recess 71 includes the positioning sections and the separation sections 84*a* to 84*e*, the metal members 82*a* to 82*d* can be positioned. In addition, it is possible to eliminate the need for wiping off the excess adhesive 13, and restrict the metal members 82*a* to 82*d* from falling off.

The groove areas 84*a* and 84*d* are open at the first end T1 and the second end T2. For this reason, it is desirable that the amount of the protruding adhesive 13 be limited to an amount with which the protruding adhesive 13 does not reach the first end T1 and the second end T2. Alternatively, it is desirable that the widths of the groove areas 84*a* and 84*d* in the X direction be such that the protruding adhesive 13 does not reach the first end T1 and the second end T2. This makes it possible to suppress the adhesive 13 from protruding from the first end T1 and the second end T2, thereby eliminating the need for wiping off the adhesive 13.

The plurality of metal members 82*a* to 82*d* are arranged in such a way as to be spaced apart from each other in the recess 71. This increases the number of groove areas 84*a* to 84*e* formed into the recess 71 compared to the case of one metal member 72. This makes it possible to restrict each of the metal members 82*a* to 82*d* from falling off. As a result, it is possible to further restrict the thermal print head from falling off the thermal printer body. The other matters are the same as those of the first embodiment and a description thereof will be omitted. Even with the recess 71 and the metal members 82*a* to 82*d* according to the ninth embodiment described above, the same operational effect as in the first embodiment can be obtained.

The plurality of embodiments described above can be implemented not only individually but also with a combination of two or more embodiments. For example, the plurality of recesses and metal members having different planar shapes illustrated in FIGS. 4 to 9 may be formed on the back surface (BS) of one heat sink 1. Further, the through-holes 44*a* and 44*b* of FIG. 7 may be formed in the metal members illustrated in FIGS. 4 to 6, FIG. 8, and FIG. 9.

The embodiments described above are examples of modes for carrying out the present invention. It should be understood that the present invention is not limited to the embodiments described above, and various modifications can be made, in addition to the embodiments described above, depending on the design without departing from the scope of the technical idea of the present invention.

In the eighth and ninth embodiments, no groove area is formed between the side surfaces S1 and S2 of the recess 71 and the metal members 72 and 82*a* to 82*d*. The metal members 72 and 82*a* to 82*d* according to one modification of the eighth and ninth embodiments may include one or more through-holes penetrating the metal members 72 and 82*a* to 82*d* in the Z direction, as in the case of the through-holes 44*a* and 44*b* illustrated in FIG. 7. The through-hole forms a new groove area where the metal member 72 is not arranged, thereby making it possible to make excess adhesive protrude into the through-hole (groove area).

The metal members 72 and 82*a* to 82*d* according to one modification of the eighth and ninth embodiments may include the protrusion-like positioning sections, which protrude toward the side surfaces S1 and S2 of the recess 71, in a portion of the outer circumference of the metal members 72 and 82*a* to 82*d*. The front edges of the protrusion-like positioning sections are in contact with the side surfaces S1 and S2 of the recess 71 to the extent allowed by the machining accuracy of the recess 71 and the metal members 72 and 82*a* to 82*d*. In this case, the protrusion-like positioning sections can be provided on a portion of the outer circumference of the metal member 72 by setting the length of the metal member 72 and 82*a* to 82*d*, which exclude the positioning sections, in the Y direction to be shorter than the distance between the pair of side surfaces S1 and S2 of the recess 71. This makes it possible to provide a new groove area between the side surfaces S1 and S2 of the recess 71 and the metal member 72. This also makes it possible to make excess adhesive protrude into this new groove area.

What is claimed is:

1. A thermal print head comprising:

a head substrate on which a plurality of heating resistance units are formed;

a heat sink thermally connected to the head substrate, a recess being formed in a back surface of the heat sink which faces a surface to which the head substrate is connected;

a metal member arranged in the recess; and an adhesive arranged between a bottom surface of the recess and the metal member, wherein the recess viewed from a direction perpendicular to the back surface includes:

an area where the metal member is arranged; and a groove area where the metal member is not arranged, a portion of the adhesive is arranged in the groove area, and the groove area is surrounded by the metal member.

2. The thermal print head according to claim 1, wherein an inner circumference of the recess viewed from the direction perpendicular to the back surface includes a plurality of positioning sections in contact with an outer circumference of the metal member.

3. The thermal print head according to claim 2, wherein the inner circumference of the recess viewed from the direction perpendicular to the back surface further includes a separation section separated from an outer circumference of the metal member.

4. The thermal print head according to claim 1, wherein the recess includes the groove area arranged in at least two positions in such a way as to sandwich the metal member.

5. The thermal print head according to claim 1, wherein a hollow is formed in a portion of the bottom surface of the recess.

6. The thermal print head according to claim 5, wherein the hollow is superimposed on the groove area when viewed from the direction perpendicular to the back surface.

7. The thermal print head according to claim 1, wherein the metal member is a ferromagnetic body.

8. The thermal print head according to claim 1, wherein the metal member is made of a cold-rolled steel sheet.

9. The thermal print head according to claim 1, wherein a surface of the metal member is galvanized.

10. The thermal print head according to claim 1, wherein the recess extends along a main scanning direction between both ends of the heat sink in the main scanning direction in which the plurality of heating resistance units are arranged.

11. The thermal print head according to claim 10, wherein the metal member is arranged in plurality in such a way as that metal members are spaced apart from each other in the recess.

12. A method of manufacturing the thermal print head according to claim 10, comprising forming the recess in the heatsink by extrusion in the main scanning direction.

13. The thermal print head according to claim 1, wherein the recess is provided with a pair of side surfaces parallel to the main scanning direction in which the plurality of heating resistance units are arranged, and the pair of side surfaces is formed from a first end in the main scanning direction to a second end in the main scanning direction of the heat sink.

14. A thermal printer comprising the thermal print head according to claim 1.

15. The thermal printer according to claim 14 further comprising a printer body to which the thermal print head is fixed by using a magnetic force of a magnet.

* * * * *